United States Patent [19]
Venkatesan et al.

[11] Patent Number: 5,856,047
[45] Date of Patent: Jan. 5, 1999

[54] HIGH POWER NICKEL-METAL HYDRIDE BATTERIES AND HIGH POWER ELECTRODES FOR USE THEREIN

[75] Inventors: Srinivasan Venkatesan, Southfield; Benjamin Reichman, West Bloomfield; Stanford R. Ovshinsky, Bloomfield Hills; Binay Prasad, Sterling Heights; Dennis A. Corrigan, Troy, all of Mich.

[73] Assignee: Ovonic Battery Company, Inc., Troy, Mich.

[21] Appl. No.: 792,358

[22] Filed: Jan. 31, 1997

[51] Int. Cl.⁶ .................................................. H01M 4/66
[52] U.S. Cl. ............................................. 429/245; 429/59
[58] Field of Search ..................................... 429/245, 59

[56] References Cited

U.S. PATENT DOCUMENTS

| | | |
|---|---|---|
| 2,969,413 | 1/1961 | Peters ................................. 429/245 X |
| 5,248,510 | 9/1993 | Lim et al. ............................ 429/245 X |
| 5,480,741 | 1/1996 | Sakai et al. ................................. 429/59 |
| 5,527,638 | 6/1996 | Kinoshita et al. ..................... 429/59 X |
| 5,640,669 | 6/1997 | Harada et al. ............................ 428/552 |
| 5,690,799 | 11/1997 | Tsukahara et al. .................... 429/59 X |

*Primary Examiner*—Stephen Kalafut
*Attorney, Agent, or Firm*—Marvin S. Siskind; Philip H. Schlazer; David W. Schumaker

[57] ABSTRACT

Nickel-metal hydride batteries and electrodes are capable of increased power output and recharge rates. The electrodes and batteries produced therefrom exhibit increased internal conductance. The positive and negative electrodes may be formed by pressing powdered metal-hydride active materials into porous metal substrates. The porous metal substrates are formed from copper, copper-plated nickel, or a copper-nickel alloy, and may be additionally plated with a material which is electrically conductive and resistant to corrosion in the battery environment, such as nickel.

16 Claims, 2 Drawing Sheets

HIGH POWER NICKEL-METAL HYDRIDE BATTERIES AND HIGH POWER ELECTRODES FOR USE THEREIN

FIELD OF THE INVENTION

The instant invention relates generally to nickel-metal hydride batteries and more specifically to high power nickel-metal hydride batteries useful for electric vehicles and hybrid electric vehicles. The batteries include electrodes which employ substrates with enhanced current collecting capabilities, thereby increasing the specific power of the batteries.

BACKGROUND OF THE INVENTION

Advanced automotive battery development for vehicle propulsion has, in the past, been directed primarily at the requirement of a true electric vehicle. To this end, Stanford Ovshinsky and his battery development teams at Energy Conversion Devices, Inc. and Ovonic Battery Company have made great advances in nickel-metal hydride battery technology.

Initially Ovshinsky and his teams focused on metal hydride alloys that form the negative electrode. As a result of their efforts, they were able to greatly increase the reversible hydrogen storage characteristics required for efficient and economical battery applications, and produce batteries capable of high density energy storage, efficient reversibility, high electrical efficiency, efficient bulk hydrogen storage without structural changes or poisoning, long cycle life, and repeated deep discharge. The improved characteristics of these "Ovonic" alloys, as they are now called, results from tailoring the local chemical order and hence the local structural order by the incorporation of selected modifier elements into a host matrix. Disordered metal hydride alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage materials were formulated, based on the disordered materials described above. These are the Ti—V—Zr—Ni type active materials such as disclosed in U.S. Pat. No. 4,551,400 ("the '400 Patent") to Sapru, Hong, Fetcenko, and Venkatesan, the disclosure of which is incorporated by reference. These materials reversibly form hydrides in order to store hydrogen. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys are also used for rechargeable hydrogen storage negative electrodes. One such family of materials are those described in U.S. Pat. No. 4,728,586 ("the '586 Patent") to Venkatesan, Reichman, and Fetcenko, the disclosure of which is incorporated by reference. The '586 Patent describes a specific sub-class of these Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

In contrast to the Ovonic alloys described above, the older alloys were generally considered "ordered" materials that had different chemistry, microstructure, and electrochemical characteristics. The performance of the early ordered materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference).

Simply stated, in all metal-hydride alloys, as the degree of modification increases, the role of the initially ordered base alloy is of minor importance compared to the properties and disorder attributable to the particular modifiers. In addition, analysis of the present multiple component alloys available on the market and produced by a variety of manufactures indicates that these alloys are modified following the guidelines established for Ovonic alloy systems. Thus, as stated above, all highly modified alloys are disordered materials characterized by multiple components and multiple phases, i.e. Ovonic alloys.

Ovshinsky and his teams next turned their attention to the positive electrode of the batteries. Positive electrodes today are typically pasted nickel electrodes, which consist of nickel hydroxide particles in contact with a conductive network or substrate, preferably having a high surface area. There have been several variants of these electrodes including the so-called plastic-bonded nickel electrodes which utilize graphite as a microconductor and also including the so-called foam-metal electrodes which utilize high porosity nickel foam as a substrate loaded with spherical nickel hydroxide particles and cobalt conductivity enhancing additives. Pasted electrodes of the foam-metal type have started to penetrate the consumer market due to their low cost and higher energy density relative to sintered nickel electrodes.

Conventionally, the nickel battery electrode reaction has been considered to be a one electron process involving oxidation of divalent nickel hydroxide to trivalent nickel oxyhydroxide on charge and subsequent discharge of trivalent nickel oxyhydroxide to divalent nickel hydroxide, as shown in equation 2 hereinbelow.

Some recent evidence suggests that quadrivalent nickel is involved in the nickel hydroxide redox reaction. This is not a new concept. In fact, the existence of quadrivalent nickel was first proposed by Thomas Edison in some of his early battery patents. However, full utilization of quadrivalent nickel has never been investigated.

In practice, electrode capacity beyond the one-electron transfer theoretical capacity is not usually observed. One reason for this is incomplete utilization of the active material due to electronic isolation of oxidized material. Because reduced nickel hydroxide material has a high electronic resistance, the reduction of nickel hydroxide adjacent the current collector forms a less conductive surface that interferes with the subsequent reduction of oxidized active material that is farther away.

Ovshinsky and his teams have developed positive electrode materials that have demonstrated reliable transfer of more than one electron per nickel atom. Such materials are described in U.S. Pat. Nos. 5,344,728 and 5,348,822 (which describe stabilized disordered positive electrode materials) and U.S. Pat. No. 5,569,563 issued Oct. 29, 1996, and U.S. Pat. No. 5,567,549 issued Oct. 22, 1996.

As a result of this research into the negative and positive electrode active materials, the Ovonic Nickel Metal Hydride (Ni-MH) battery has reached an advanced stage of development for EVs. Ovshinsky's teams have been able to produce electric vehicle batteries which are capable of propelling an electric vehicle to over 350 miles on a single charge (Tour d'Sol 1996). The Ovonic Ni-MH battery has demonstrated excellent energy density (up to about 90 Wh/Kg), long cycle life (over 1000 cycles at 80% DOD), abuse tolerance, and rapid recharge capability (up to 60% in 15 minutes). Additionally, the Ovonic battery has demonstrated higher power density than any other battery technology under test and evaluation for use as an EV stored energy source.

While Ovshinsky and his teams have made great advances in batteries for true electric vehicles, the Partnership for a New Generation of Vehicles (PNGV), a U.S. government-auto industry partnership initiated in 1996, has suggested that hybrid-electric vehicles (HEV's) could be the leading candidate to meet their goals of tripling auto fuel economy in the next decade. To realize this goal, lightweight, compact, high-power batteries would be required.

The use of a hybrid drive system offers critical advantages for both fuel economy and ultra-low emissions. Fuel engines achieve maximum efficiency when operating at constant rpm. Therefore, peak fuel efficiency can be achieved by employing a constant rpm fuel engine to provide energy to a high-power energy storage system that supplies peak power for acceleration and also recaptures kinetic energy through the use of regenerative braking.

Similarly, the ability to use a small engine operating at maximum efficiency and coupled with a pulse power energy storage system offers the best design for minimizing emissions associated with the use of a fuel engine. Therefore, a key enabling technology for HEV's is an energy storage system capable of providing very high pulse power and accepting high regenerative braking currents at very high efficiency. The duty cycle of a pulse power application requires exceptional cycle life at low depths of discharge.

It is important to understand the different requirements for this energy storage system compared to those for a pure electric vehicle. Range is the critical factor for a practical EV, making energy density the critical evaluation parameter. Power and cycle life are certainly important, but they become secondary to energy density for an EV.

By contrast, in the HEV pulse power application, power density is the overwhelming consideration. Excellent cycle life under low depth discharge is also more critical than the more typical cycle life at 80% DOD required by EV applications. Energy density is important to minimize battery weight and space, but due to the smaller battery size this characteristic is less critical than power density. Ability for rapid recharge is also essential to allow efficient regenerative braking, and charge/discharge efficiency is critical to maintain battery state of charge in the absence of external charging.

Given the fundamental differences in requirements between the EV and those for an HEV application, it could be expected that those batteries currently optimized for use in EV applications will not be suitable for HEV without an increase in power density. While the demonstrated performance of Ovonic EV batteries has been impressive, these cell and battery designs have been optimized for use in pure EVs and therefore do not meet the specific requirements for HEVs.

Therefore, there is a need for high power batteries that have the peak power performance required by HEVs coupled with the already demonstrated performance characteristics and proven manufacturability of the Ovonic Ni-MH batteries.

SUMMARY OF THE INVENTION

An objective of the present invention is to provide nickel-metal hydride batteries and electrodes capable of increased power output and recharge rates. Another objective of the present invention is to provide Ni-MH batteries that provide sufficient power for EV and HEV applications.

These and other objectives are satisfied by a nickel-metal hydride battery including at least one negative electrode having a porous metal substrate, the improvement comprising: the porous metal substrate is formed from copper, copper-plated nickel, or a copper-nickel alloy.

These and other objectives are also satisfied by a negative electrode for use in a nickel-netal hydride battery, said negative electrode including a porous metal substrate, the improvement comprising: the porous metal substrate formed from copper, copper-plated nickel, or a copper-nickel alloy.

DETAILED DESCRIPTION OF THE INVENTION

An objective of the present invention is to improve the power output from a nickel-metal hydride (Ni-MH) rechargeable battery. Generally, the power output may be increased by lowering the internal resistance of the battery. Lowering the internal resistance decreases the power wasted due to dissipation within the battery, thereby increasing the power which is available to drive external loads. The internal resistance of a nickel-metal hydride battery can be decreased by increasing the conductivity of the battery components as well as the connections between the components. More specifically, the internal resistance can be decreased by increasing the conductivity of both the positive and negative electrodes of the battery.

Figure 1:
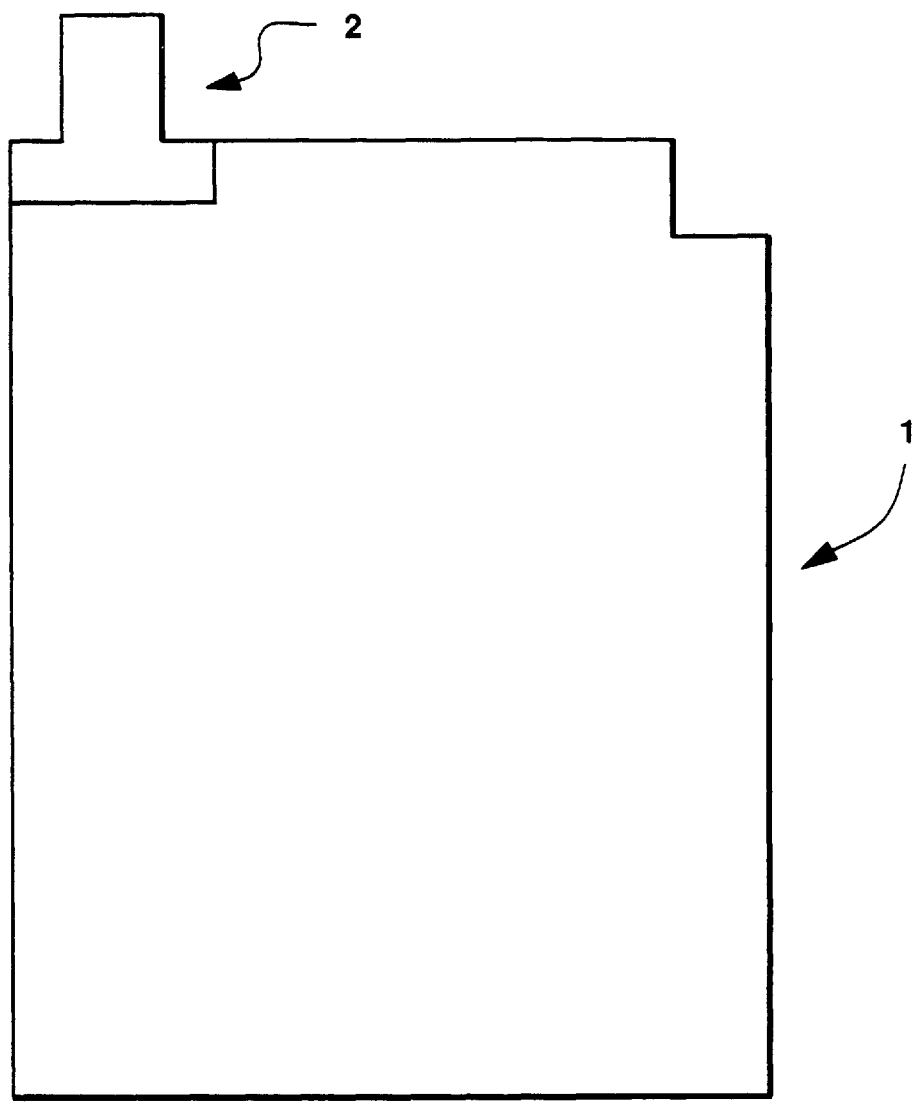
FIG. 1 depicts an electrode for a prismatic Ni-MH battery attached to an electrode tab.

Generally, a Ni-MH battery includes at least one negative electrode and at least one positive electrode. An electrode tab may be attached to each of the negative and positive electrodes in order to electrically connect each of the electrodes to the appropriate terminal of the Ni-MH battery (i.e., negative electrode to negative terminal and positive electrode to positive terminal). FIG. 1 shows an embodiment of an electrode 1 attached to an electrode tab 2 for a prismatic Ni-MH battery. The electrode 1 shown in FIG. 1 is representative of either a negative or positive electrode of the Ni-MH battery. The electrode tab 2 may be attached anywhere on the electrode 1. Preferably, the electrode tab 2 is attached along the top of the electrode 1 so it may be easily connected to the appropriate battery terminal. More than one electrode tab 2 may be attached to each electrode.

The electrode tab 2 may be formed from any electrically conducting material which is resistant to corrosion from the battery environment. Preferably, the electrode tab 2 may be formed from nickel, or nickel-plated copper. Forming the electrode tab 2 from nickel-plated copper rather than from nickel decreases the resistance of the electrode tab and increases the power output from the battery.

Ni-MH batteries employ a negative electrode having an active material that is capable of the reversible electrochemical storage of hydrogen. The negative electrode also includes a porous metal substrate which holds the active material. The negative electrode may be formed by pressing the active material (in powdered form) into the porous metal substrate. After the powdered active material is pressed into the porous metal substrate, the negative electrode may be sintered.

Upon application of an electrical potential across a Ni-MH battery, the active negative electrode material is charged by the electrochemical absorption of hydrogen and the electrochemical generation of hydroxyl ions. The electrochemical reaction at the negative electrode is as follows:

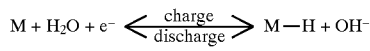

The negative electrode reactions are reversible. Upon discharge, the stored hydrogen is released to form a water molecule and evolve an electron.

The active material of the negative electrode is a hydrogen storage material. The hydrogen storage material may be chosen from the Ti—V—Zr—Ni active materials such as those disclosed in U.S. Pat. No. 4,551,400 ("the '400 Patent"), the disclosure of which is incorporated by reference. As discussed above, the materials used in the '400 Patent utilize a generic Ti—V—Ni composition, where at least Ti, V, and Ni are present with at least one or more of Cr, Zr, and Al. The materials of the '400 Patent are multiphase materials, which may contain, but are not limited to, one or more phases with $C_{14}$ and $C_{15}$ type crystal structures.

There are other Ti—V—Zr—Ni alloys which may also be used for the hydrogen storage material of the negative electrode. One family of materials are those described in U.S. Pat. No. 4,728,586 ("the '586 Patent"), the disclosure of which is incorporated by reference. The '586 Patent discloses a specific sub-class of these Ti—V—Ni—Zr alloys comprising Ti, V, Zr, Ni, and a fifth component, Cr. The '586 Patent mentions the possibility of additives and modifiers beyond the Ti, V, Zr, Ni, and Cr components of the alloys, and generally discusses specific additives and modifiers, the amounts and interactions of the modifiers, and the particular benefits that could be expected from them.

In addition to the materials described above, hydrogen storage materials for the negative electrode of a Ni-MH battery may also be chosen from the disordered metal hydride alloy materials that are described in detail in U.S. Pat. No. 5,277,999 ("the '999 Patent"), to Ovshinsky and Fetcenko, the disclosure of which is incorporated by reference.

As discussed, the negative electrode may be formed by pressing active hydrogen storage material into a porous metal substrate. The conductivity of the negative electrode can be increased by increasing the conductivity of the negative electrode's porous metal substrate. Generally, the porous metal substrate includes, but is not limited to, mesh, grid, matte, foil, foam, plate, and expanded metal. Preferably, the porous metal substrate used for the negative electrode is a mesh, grid, or expanded metal. The present invention discloses a negative electrode for a Ni-MH battery comprising a porous metal substrate that is formed from copper, copper-plated nickel, or a copper-nickel alloy. As used herein, "copper" refers to either pure copper or an alloy of copper, and "nickel" refers to either pure nickel or an alloy of nickel.

Figure 2:
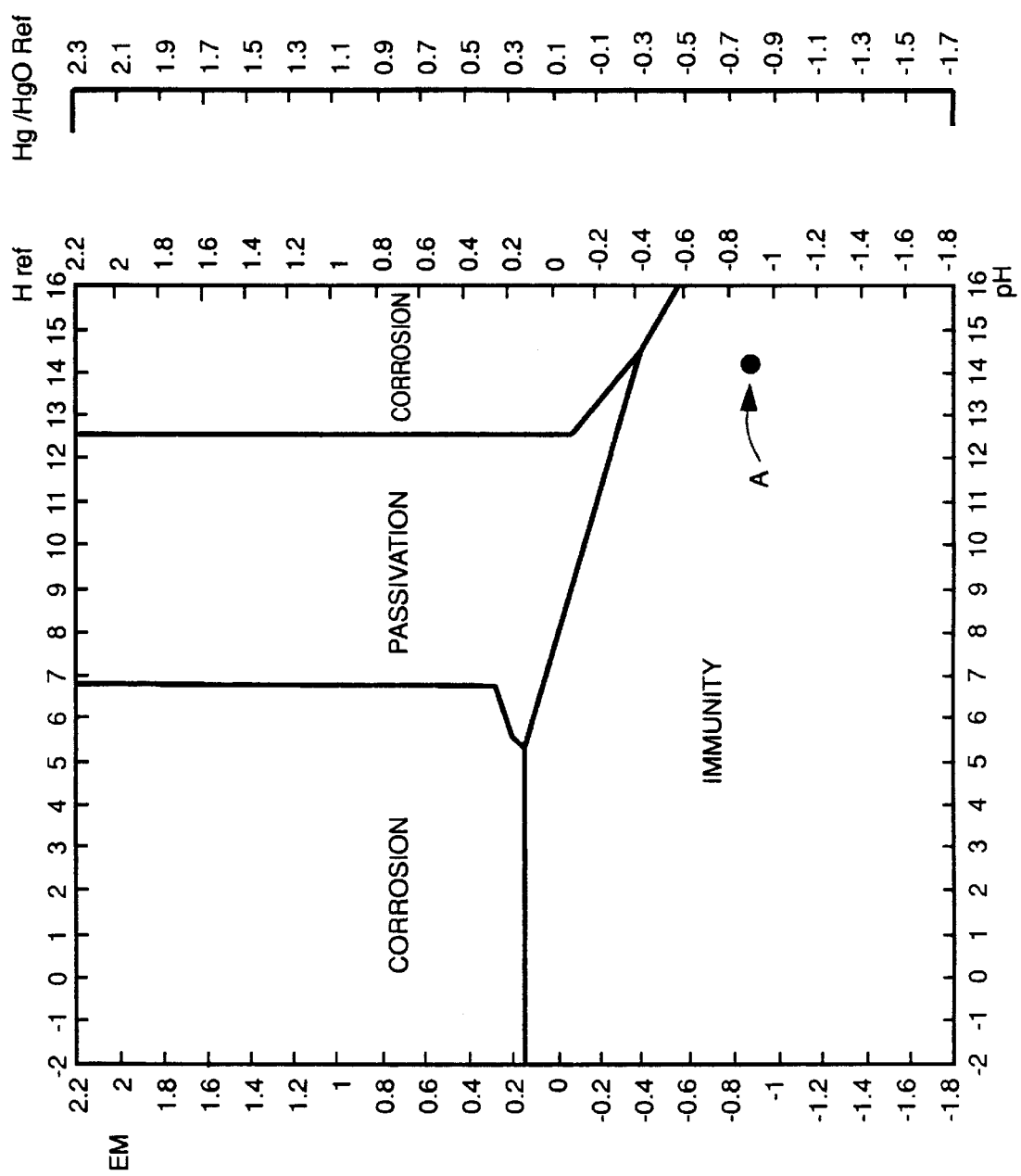
FIG. 2 depicts domains of corrosion, immunity, and passivity of copper at 25° C.

FIG. 2 illustrates the domains of corrosion, immunity and passivation of copper at 25° C. The horizontal axis represents the pH of the electrolyte, and the vertical axis represents the electrical potential of the copper material. The electrical potential is shown relative to a hydrogen reference (vertical axis labelled "H") as well as relative to an Hg/HgO reference (vertical axis labelled "Hg/HgO". As used herein, all voltage values are given relative to an Hg/HgO reference unless otherwise stated. Use of copper in alkaline cells has been avoided because of the solubility of copper in KOH electrolyte. FIG. 2 illustrates that at certain operating conditions (i.e., pH and potential) copper will corrode. FIG. 2 also illustrates that at the appropriate values of pH and potential, copper is immune from corrosion. At the appropriate operating conditions, a copper substrate in contact with the metal hydride active material is cathodically protected under the full range of operating conditions for a Ni-MH cell.

During normal charge/discharge cycling of a Ni-MH battery, the metal hydride negative electrode is at a potential of about −0.85 volts, and the pH at the metal hydride negative electrode is about 14. This operating point is shown as operating point A in FIG. 2. As seen from FIG. 2, the operating voltage of −0.85 volts is lower (i.e., more negative) than the copper dissolution voltage of approximately −0.4 volts (for a pH of about 14). Hence, during the normal charge/discharge cycling of a Ni-MH battery, the metal hydride negative electrode using a copper substrate is immune from corrosion.

During overdischarge of a Ni-MH battery, the positive electrode becomes a hydrogen evolution electrode whereby the reduction of nickel is replaced by the electrolysis of water into hydrogen gas and hydroxide ions. Because the Ni-MH battery is designed with a stoichiometric excess of metal hydride active material, the negative electrode potential remains close to −0.8 volts. As well, the hydrogen evolved at the positive electrode is oxidized at the metal hydride negative electrode, further stabilizing the negative electrode potential at about −0.8 volts. At low currents, overdischarge can occur indefinitely without the discharge of the metal hydride negative electrode needed to increase negative electrode potential to the value required for copper dissolution. At high currents, hydrogen evolves faster than it recombines and there is a net discharge of the metal hydride negative electrode. However, the discharge is much less than that required to raise the negative electrode potential to a level permitting copper dissolution. Even when the negative and positive electrodes are shorted together, the stoichiometric excess of metal hydride ensures that the metal hydride negative electrode remains at a potential of about −0.8 volts, and is still protected from copper dissolution. Hence, the copper in the metal hydride negative electrode substrate is protected under all conditions except those where the metal hydride negative electrode would necessary be irreversibly damaged due to oxidation itself.

As shown, at the operating conditions of the metal hydride negative electrode, the copper substrate material is protected from corrosion. However, to increase battery reliability and further protect the negative electrode from the harsh chemical environment within the battery, the porous metal substrate formed from the aforementioned materials of copper, copper-plated nickel, or a copper-nickel alloy may still be additionally plated with a material which is electrically conductive yet resistant to corrosion in the battery environment. An example of a material that can be used to plate the porous metal substrate includes, but is not limited to, nickel.

Using copper to form the porous metal substrate of the negative electrode has several important advantages. Copper is an excellent electrical conductor. Hence, its use as a substrate material decreases the resistance of the negative electrode. This decreases the amount of battery power wasted due to internal dissipation, and thereby provides a Ni-MH battery having increased output power.

Copper is also a malleable metal. Malleability is very important because of the expansion and contraction of the negative electrodes during charge and discharge cycling of a Ni-MH battery. The increased pliability of the substrate helps prevent electrode breakage as a result of the expansion and contraction, thereby resulting in improved battery reliability.

Increased substrate malleability also allows the substrate to more reliably hold the active hydrogen storage material that is compressed onto the substrate surface. This lessens the need to sinter the negative electrodes after the active material has been compressed onto the substrate, thereby simplifying and reducing the cost of the electrode manufacturing process.

The conductivity of the negative electrode can also be increased by increasing the conductivity of the negative electrode's active material (i.e., the metal hydride active material). The conductivity of the active material can be increased by incorporating copper into the metal hydride material. This may be done in many different ways. One way is to mix a copper powder with the metal hydride during formation of the active material. Another way is to encapsulate the metal hydride particles with copper by an electroless plating process. As well as increasing conductivity, the addition of copper will allow for a lower sintering temperature when the active material is sintered to a copper substrate.

The conductivity of the negative electrode can also be increased by copper-plating the negative electrode after the active metal hydride material has been compressed (and possibly sintered) onto the substrate. The copper-plating may be patterned or unpatterned. As well as increasing electrode conductivity, the copper-plating provides an additional means of ensuring that the active material remains adhered to the substrate.

The negative electrode described herein is applicable to all Ni-MH batteries including, but not limited to, prismatic Ni-MH batteries and cylindrical jelly-rolled Ni-MH batteries.

The power output from a nickel-metal hydride battery can also be increased by increasing the conductivity of the battery's positive electrodes. As in the case of the negative electrodes, this can be done by appropriately selecting the materials from which electrode components are made.

Ni-MH batteries employ at least one positive electrode having active material formed from nickel hydroxide. The positive electrode also includes a porous metal substrate which holds the active material. The positive electrode may be formed by pressing the active positive electrode material (in powdered form) into a porous metal substrate. One or more electrode tabs may be attached to the positive electrode to electrically connect the positive electrode to the positive battery terminal.

The reactions that take place at the positive electrode are as follows:

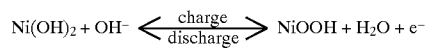

The nickel hydroxide positive electrode is described in U.S. Pat. Nos. 5,344,728 and 5,348,822 (which describe stabilized disordered positive electrode materials) and U.S. Pat. No. 5,569,563 and U.S. Pat. No. 5,567,549 the disclosures of which are incorporated by reference.

The conductivity of the positive electrode may be increased by increasing the conductivity of the positive electrode's porous metal substrate. The porous metal substrate of the positive electrode includes, but is not limited to, mesh, grid, matte, foil, foam, plate, and expanded metal. Preferably, the porous metal substrate is foam. Disclosed herein, is a positive electrode comprising a porous metal substrate that is formed from copper, copper-plated nickel, or a copper-nickel alloy. Forming the substrate from one or more of these materials increases the conductivity of the positive electrodes of the battery. This decreases the amount of power wasted due to internal power dissipation, and thereby increases the power output of the Ni-MH battery.

To protect the porous metal substrate of the positive electrode from the harsh battery environment, the porous metal substrate may be plated with a material which is electrically conductive yet resistant to corrosion in the battery environment. Preferably, the porous metal substrate may be plated with nickel.

The positive electrodes disclosed herein, are applicable for all Ni-MH batteries including, but not limited to, prismatic Ni-MH batteries and cylindrical jelly-rolled Ni-MH batteries.

Another aspect of this invention is a nickel-metal hydride battery having at least one positive electrode of the type disclosed herein. And yet another aspect of this invention is a nickel-metal hydride battery having at least one negative electrode of the type disclosed herein. The type of nickel-metal hydride battery includes, but is not limited to, prismatic Ni-MH batteries and cylindrical jelly-rolled Ni-MH batteries (i.e., AA-cells, C-cells, etc.).

EXAMPLE 1

Table 1 below shows specific power at both 50% and 80% DOD (depth of discharge) for prismatic Ni-MH batteries having positive and negative electrodes comprised of substrate materials disclosed herein.

TABLE 1

| Electrode Substrate | | Specific Power (Watts/kg) | |
|---|---|---|---|
| Positive | Negative | 50% | 80% |
| 1) Ni foam | Ni expanded metal | 214 | 176 |
| 2) Ni foam | Cu expanded metal | 338 | 270 |

Cell Capacity: 121 amp-hours
Positive Electrode Dimensions: 5.5" H × 3.5" W × .0315" D
Negative Electrode Dimensions: 5.25" H × 3.38" W × .0145" D In Example 1, the dimensions of the positive electrodes are 5.5" height, 3.5" width and 0.0315" depth. The dimensions of the negative electrodes are 5.25" height, 3.38" width and 0.0145" depth. In Row 1 of Table 1, both the positive electrode substrate and the negative electrode substrate are formed from nickel (the positive electrode substrate is formed from nickel foam and the negative electrode substrate is formed from nickel expanded metal). In this case, the specific power at 50% DOD is about 214 Watts/kg and the specific power at 80% DOD is about 176 Watts/kg.

In Row 2 of Table 1, the positive electrode substrate is formed from nickel foam, but the negative electrode substrate is now formed from a copper expanded metal. In this case, the specific power at 50% DOD is about 338 Watts/kg and the specific power at 80% DOD is about 270 Watts/kg.

The specific power output of a Ni-MH battery may also be increased by adjusting the height, width and depth of the positive and negative electrodes. The ratio of height to width of the electrodes (i.e., height divided by width) is defined herein as the "aspect ratio" of the electrodes. The aspect ratio of the positive and negative electrodes may be adjusted to increase specific power. Furthermore, electrodes can be made thinner in order to incorporate more electrode pairs into each battery, thereby decreasing the current density of each electrode.

EXAMPLE 2

Table 2 shows specific power for a prismatic Ni-MH battery using a positive electrode substrate of nickel foam and a negative electrode substrate of copper expanded metal. In addition, the aspect ratios of both the positive and negative electrodes have been changed from those of Example 1 to increase the specific power output of the battery.

TABLE 2

| Electrode Substrate | | Specific Power (Watts/kg) | |
| --- | --- | --- | --- |
| Positive | Negative | 50% | 80% |
| 1) Ni foam | Cu expanded metal | 505 | 350 |

Cell Capacity: 62 amp-hours
Positive Electrodes Dimension: 3.1" H × 3.5" W × 0.028" D
Negative Electrodes Dimension: 2.9" H × 3.3" W × 0.013" D In Example 2, the aspect ratios (height divided by width) of both the positive and negative electrodes have been changed to increase the specific power of the battery. The positive electrodes have dimensions of about 3.1" height× 3.5" width, and the negative electrodes have dimensions of about 2.9" height×3.3" width. The aspect ratios of the positive and negative electrodes of Example 2 are about 0.89 and about 0.88 respectively. In contrast, the aspect ratios of the positive and negative electrodes of Example 1 are about 1.57 and about 1.55 respectively. The aspect ratios of Example 2 are closer to "one" than those of Example 1.

In Example 2, the positive and negative electrodes have also been made thinner to incorporate more electrode pairs in the battery, thereby decreasing the current density of each electrode. In Example 2, the positive electrodes have a depth of about 0.028", and the negative electrodes have a depth of about 0.013". Ni-MH batteries using positive and negative electrodes having similar aspect ratios to those of Example 2, but using nickel for both the positive and negative electrodes, have specific power of about 300 Watts/kg at 50% DOD and about 225 Watts/kg at 80% DOD.

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims appended hereinafter.

We claim:

1. In a nickel-metal hydride battery including at least one negative electrode having a porous metal substrate, the improvement comprising:

said porous metal substrate comprising copper, copper-plated nickel, or a copper-nickel alloy, said copper, copper-plated nickel, or copper-nickel alloy being exposed to the electrolyte.

2. The battery of claim 1, wherein said battery is a cylindrical battery.

3. The battery of claim 1, wherein said battery is a prismatic battery.

4. The battery of claim 1, wherein said at least one negative electrode is formed by pressing powdered active materials into said porous metal substrate.

5. The battery of claim 1, wherein said porous metal substrate is plated with a material which is electrically conductive and resistant to corrosion in the battery environment.

6. The battery of claim 5, wherein said material which is electrically conductive and resistant to corrosion in the battery environment is nickel.

7. The battery of claim 1, wherein said copper-nickel alloy has a resistivity less than pure nickel.

8. In a negative electrode for use in a nickel-metal hydride battery, said negative electrode including a porous metal substrate, the improvement comprising:

said porous metal substrate comprising copper, copper-plated nickel, or a copper-nickel alloy, said copper, copper-plated nickel, or copper-nickel alloy being exposed to the electrolyte.

9. The negative electrode of claim 8, wherein said negative electrode is adapted for use in a cylindrical battery.

10. The negative electrode of claim 8, wherein said negative electrode is adapted for use in a prismatic battery.

11. The negative electrode of claim 8, wherein said negative electrode is formed by pressing powdered active materials into said porous metal substrate.

12. The negative electrode of claim 8, wherein said substrate is plated with a material which is electrically conductive and resistant to corrosion in the battery environment.

13. The negative electrode of claim 12, wherein said material which is electrically conductive and resistant to corrosion in the battery environment is nickel.

14. The negative electrode of claim 8, wherein said copper-nickel alloy has a resistivity less than pure nickel.

15. In a nickel-metal hydride battery including at least one negative electrode having a porous metal substrate, the improvement comprising:

said porous metal substrate comprising substantially pure copper, said copper being exposed to the electrolyte.

16. In a negative electrode for use in a nickel-metal hydride battery, said negative electrode including a porous metal substrate, the improvement comprising:

said porous metal substrate comprising substantially pure copper, said copper being exposed to the electrolyte.

* * * * *